United States Patent
Zhou et al.

(10) Patent No.: US 11,184,615 B2
(45) Date of Patent: Nov. 23, 2021

(54) IMAGE CODING METHOD AND APPARATUS AND IMAGE DECODING METHOD AND APPARATUS

(71) Applicant: Fujitsu Limited, Kawasaki (JP)

(72) Inventors: Jing Zhou, Beijing (CN); Akira Nakagawa, Kawasaki (JP); Sihan Wen, Beijing (CN); Zhiming Tan, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/855,465

(22) Filed: Apr. 22, 2020

(65) Prior Publication Data

US 2020/0374522 A1 Nov. 26, 2020

(30) Foreign Application Priority Data

May 22, 2019 (CN) .................. 201910429351.7

(51) Int. Cl.
*H04N 19/124* (2014.01)
*H04N 19/13* (2014.01)
*G06N 3/02* (2006.01)

(52) U.S. Cl.
CPC .......... *H04N 19/124* (2014.11); *H04N 19/13* (2014.11); *G06N 3/02* (2013.01)

(58) Field of Classification Search
CPC ...... H04N 19/124; H04N 19/13; H04N 19/94; H04N 19/14; H04N 19/179; H04N 19/186; H04N 5/247; H04N 19/119; H04N 19/12; H04N 19/122; H04N 19/149; H04N 19/157; H04N 19/176; H04N 19/18;

(Continued)

(56) References Cited

U.S. PATENT DOCUMENTS 10,713,794 B1 * 7/2020 He .................. G06N 3/0454
2011/0285557 A1 * 11/2011 Korodi ............. H03M 7/4006
341/52

(Continued)

FOREIGN PATENT DOCUMENTS

CN 102939719 2/2013
CN 103430541 12/2013

OTHER PUBLICATIONS

Yi Wei et al., "Quantization Mimic: Towards Very Tiny CNN for Object Detection" ECCV 2018 Springer (Year: 2018).*

(Continued)

*Primary Examiner* — Dramos Kalapodas
(74) *Attorney, Agent, or Firm* — Staas & Halsey, LLP

(57) ABSTRACT

Embodiments of this disclosure provide an image coding method and apparatus and an image decoding method and apparatus. The image coding method includes: performing feature extraction on to-be-processed image data by using a convolutional neural network, to generate feature maps of the image data; quantizing the feature maps to generate discrete feature maps; preprocessing the discrete feature maps to generate preprocessed data, an amount of data of the preprocessed data being less than an amount of data of the discrete feature maps; calculating probabilities of to-be-coded data in the discrete feature maps according to the preprocessed data; and performing entropy coding on the to-be-coded data according to the probabilities of the to-be-coded data.

6 Claims, 9 Drawing Sheets

(58) Field of Classification Search
CPC .... H04N 19/192; H04N 19/196; H04N 19/53; H04N 19/593; H04N 19/70; H04N 19/82; H04N 19/91; G06N 3/02; G06N 3/084; G06N 3/0445; G06N 3/0472; G06N 3/0454; G06K 9/00744; G06K 9/3233; G06T 7/11; G06T 2210/12; G06T 2207/20081; H03M 7/4006
See application file for complete search history.

(56) References Cited

U.S. PATENT DOCUMENTS

| | | | | |
|---|---|---|---|---|
| 2012/0057799 | A1 | 3/2012 | Nguyen et al. | |
| 2013/0315300 | A1* | 11/2013 | Lee | H04N 19/122 375/240.02 |
| 2017/0295381 | A1* | 10/2017 | Choi | H04N 19/61 |
| 2019/0122073 | A1* | 4/2019 | Ozdemir | A61B 6/5217 |
| 2019/0171871 | A1* | 6/2019 | Zhang | G06K 9/6271 |
| 2019/0172223 | A1* | 6/2019 | Vajda | G06K 9/4633 |
| 2019/0172224 | A1* | 6/2019 | Vajda | G06T 7/77 |
| 2020/0092556 | A1* | 3/2020 | Coelho | H04N 19/96 |
| 2020/0304802 | A1* | 9/2020 | Habibian | G06K 9/6271 |
| 2020/0329233 | A1* | 10/2020 | Nemirofsky | H04N 19/176 |

OTHER PUBLICATIONS

Siwei Ma et al., (hereinafter Ma) "Image and Video Compression Neural Networks"arxiv.org, Cornell University Library, 201 Olin Library Cornell University Ithaca, NY 14853, Apr. 7, 2019, XP881165996_IEEE (Year: 2019).*

Jing Zhou et al.: "Multi-scale and Context-adaptive Entropy Model for Image Compression", arxiv.org, Cornell University Library, 201 Olin Library Cornell University Ithaca, NY 14853, Oct. 17, 2019, 4 pages.

Extended European Search Report dated Jun. 24, 2020 in European Patent Application No. P139657EP00/CLF.

Jing Zhou et al.: "Multi-scale and Context-adaptive Entropy Model for Image Compression", arxiv.org, Cornell University Library, 201 Olin Library Cornell University Ithaca, NYY 14853, Oct. 17, 2019, 4 pages.

David Minnen et al.: "Joint Autoregressive and Hierarchical Priors for Learned Image Compression", arxiv.org, Cornell University Library, 201 Olin Library Cornell University Ithaca, NY 14853, Sep. 8, 2018, XP888914979, 22 pages.

Johannes Ballé et al.: "Variational Image Compression With a Scale Hyperprior", May 1, 2018, XP055632204, 23 pages.

Siwei Ma et al.: "Image and Video Compression with Neural Networks: A Review", arxiv.org, Cornell University Library, 201 Olin Library Cornell University Ithaca, NY 14853, Apr. 7, 2019, XP881165996, 16 pages.

Extended European Search Report dated Jun. 24, 2020 in European Patent Application No. 20151116.9.

Dong Jie, et al., "Adaptive binary arithmetic coding based on context: A new entropy coding technique for video compression"; Zhejiang University, Digital TV & Digital Video, China Academic Journal Electronic Publishing House, Paper ID: 1002-8692 (2003) 08-0009-03, 3 pages.

* cited by examiner

IMAGE CODING METHOD AND APPARATUS AND IMAGE DECODING METHOD AND APPARATUS

CROSS-REFERENCE TO RELATED APPLICATIONS

This application is based on and hereby claims priority to Chinese Application No. 201910429351.7, filed May 22, 2019, in the State Intellectual Property Office of China, the disclosure of which is incorporated herein by reference.

TECHNICAL FIELD

This disclosure relates to the field of image processing.

BACKGROUND

With the development of computer technology, the application of images has become more and more extensive. In order to efficiently store and transmit image files, image compression of image files is needed. Image compression may be seen as a tradeoff between code rate and a degree of compression distortion.

According to Shannon's source coding theorem, a theoretical limit of data compression is information entropy. In other words, if entropy of image data may be accurately estimated, the image data may be denoted by using relatively few bits or a relatively small code rate, thereby achieving rate-distortion balance.

In order to calculate entropy of image data, it is needed to determine probabilities of data to be coded first. However, in normal situations, the probabilities of the data to be coded are not known, and therefore, the probabilities of the data to be coded need to be estimated. If the probabilities of the data to be coded may be accurately estimated, the image data may be denoted by using relatively few bits or a relatively small code rate, thereby facilitating improvement of a coding efficiency of the image data.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to an embodiment of this disclosure, there is provided an image coding method, including:
performing feature extraction on to-be-processed image data by using a convolutional neural network, to generate feature maps of the image data;
quantizing the feature maps to generate discrete feature maps;
preprocessing the discrete feature maps to generate preprocessed data, an amount of data of the preprocessed data being less than an amount of data of the discrete feature maps;
calculating probabilities of to-be-coded data in the discrete feature maps according to the preprocessed data; and
performing entropy coding on the to-be-coded data according to the probabilities of the to-be-coded data.

According to an embodiment of this disclosure, there is provided an image decoding method, including:
preprocessing decoded data to generate preprocessed data, an amount of data of the preprocessed data being less than an amount of data of the decoded data;
calculating probabilities of current to-be-decoded data according to the preprocessed data;
performing entropy decoding on the to-be-decoded data according to the probabilities, to obtain feature maps; and
reconstructing the feature maps, to generate image data.

According to an embodiment of this disclosure, there is provided an image coding method, including:
performing feature extraction on to-be-processed image data by using a convolutional neural network, to generate feature maps of the image data;
quantizing the feature maps to generate discrete feature maps;
calculating probabilities of to-be-coded data in the discrete feature maps;
generating flag data, the flag data being used for indicating whether data of channels in the discrete feature maps are all zero; and
performing entropy coding on the to-be-coded data according to the flag data and the probabilities of the to-be-coded data.

According to an embodiment of this disclosure, there is provided an image decoding method, including:
estimating probabilities of current to-be-decoded data;
performing entropy decoding on the to-be-decoded data according to flag data and the probabilities of the to-be-decoded data, to obtain feature maps; wherein the flag data are used to indicate whether data of channels in the feature maps are all zero; and
reconstructing the feature maps, to generate image data.

According to an embodiment of this disclosure, there is provided an image coding apparatus, including:
a convolutional neural network coder configured to perform feature extraction on to-be-processed image data by using a convolutional neural network, to generate feature maps of the image data;
a quantizer configured to quantize the feature maps to generate discrete feature maps;
a preprocessor configured to preprocess the discrete feature maps to generate preprocessed data, an amount of data of the preprocessed data being less than an amount of data of the discrete feature maps;
a probability estimator configured to calculate probabilities of to-be-coded data in the discrete feature maps according to the preprocessed data; and
an entropy coder configured to perform entropy coding on the to-be-coded data according to the probabilities of the to-be-coded data.

According to an embodiment of this disclosure, there is provided an image decoding apparatus, including:
a preprocessor configured to preprocess decoded data to generate preprocessed data, an amount of data of the preprocessed data being less than an amount of data of the decoded data;
a probability estimator configured to calculate probabilities of current to-be-decoded data according to the preprocessed data;
an entropy decoder configured to perform entropy decoding on the to-be-decoded data according to the probabilities, to obtain feature maps; and
a convolutional neural network decoder configured to reconstruct the feature maps, to generate image data.

According to an embodiment of the embodiments of this disclosure, there is provided an image coding apparatus, including:

a convolutional neural network coder configured to perform feature extraction on to-be-processed image data by using a convolutional neural network, to generate feature maps of the image data;

a quantizer configured to quantize the feature maps to generate discrete feature maps;

a probability estimator configured to calculate probabilities of to-be-coded data in the discrete feature maps;

a flag data generator configured to generate flag data, the flag data being used for indicating whether data of channels in the discrete feature maps are all zero; and an entropy coder configured to perform entropy coding on the to-be-coded data according to the flag data and the probabilities of the to-be-coded data, to generate a binary code stream.

According to an embodiment of this disclosure, there is provided an image decoding apparatus, including:

a probability estimator configured to estimate probabilities of current to-be-decoded data;

an entropy decoder configured to perform entropy decoding on the to-be-decoded data according to flag data and the probabilities of the to-be-decoded data, to obtain feature maps; wherein the flag data are used to indicate whether data of channels in the feature maps are all zero; and a convolutional neural network decoder configured to reconstruct the feature maps, to generate image data.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps (operations) or components but does not preclude the presence or addition of one or more other features, integers, steps (operations), components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one implementation.

In the drawings.

DETAILED DESCRIPTION

Figure 1:
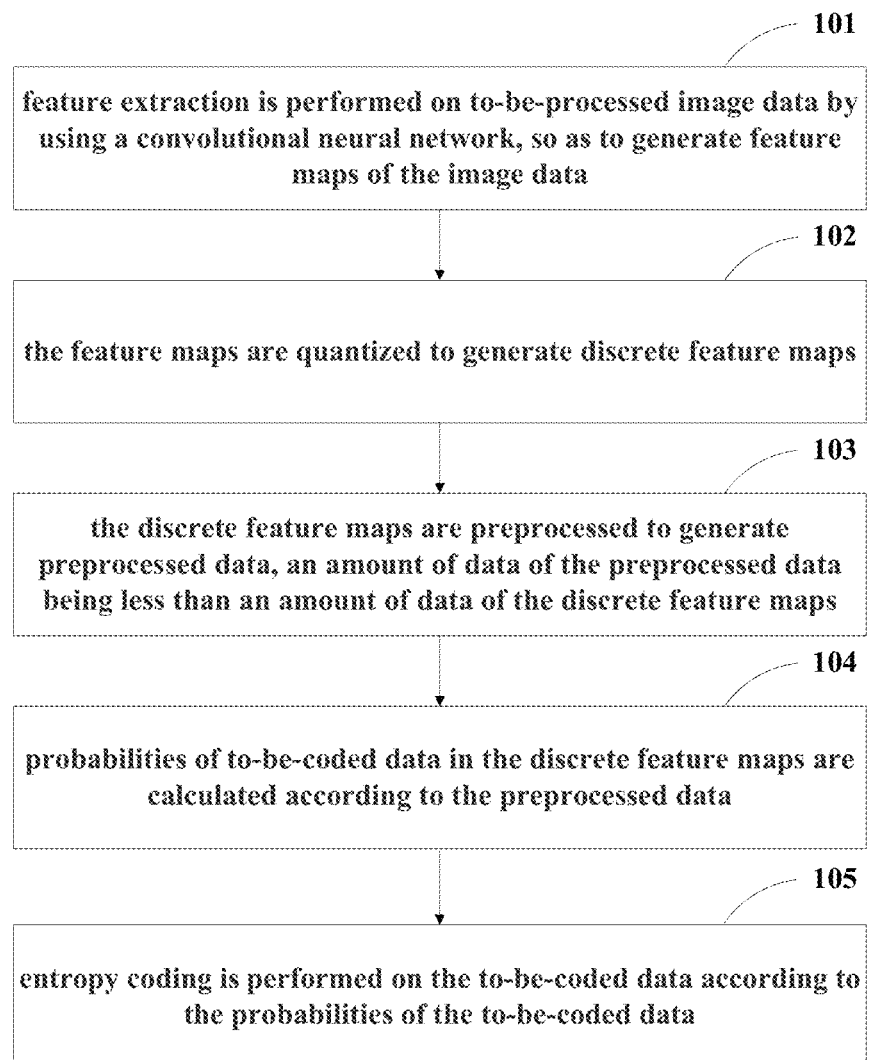
FIG. 1 is a schematic diagram of a process of the image coding method of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings, and these embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, exemplary explanations shall be given by taking a convolutional neural network (CNN) as an example; however, this disclosure is not limited thereto. Reference may be made to related techniques for basic concept and contents of the CNN.

Currently, autoregressive prior methods may well perform probability estimation. For example, probability estimation may be performed by using an entropy model including an autoregressive model and a hierarchical prior model.

However, it was found by the inventors that the autoregressive model needs outstanding computation overhead, hence, relatively large latency will be produced in coding and decoding image data. And furthermore, in performing coding and decoding on images by using probabilities calculated according to the entropy model, efficiencies of a coder and a decoder are also important factors having effects on lengths of times for coding and decoding image data.

Embodiments of this disclosure provide an image coding method and apparatus and an image decoding method and apparatus in which lengths of times for coding and decoding image data may be shortened.

Thus, one advantage of the embodiments of this disclosure exists in that lengths of times for coding and decoding image data may be shortened.

First Aspect of the Embodiments

The embodiments of this disclosure provide an image coding method. FIG. 1 is a schematic diagram of a process of the image coding method of the embodiment of this disclosure. As shown in FIG. 1, the method includes:

101: feature extraction is performed on to-be-processed image data by using a convolutional neural network, to generate feature maps of the image data;

102: the feature maps are quantized to generate discrete feature maps;

103: the discrete feature maps are preprocessed to generate preprocessed data, an amount of data of the preprocessed data being less than an amount of data of the discrete feature maps;

104: probabilities of to-be-coded data in the discrete feature maps are calculated according to the preprocessed data; and

105: entropy coding is performed on the to-be-coded data according to the probabilities of the to-be-coded data.

In the embodiments of this disclosure, by preprocessing the discrete feature maps, preprocessed data with a small amount of data are generated, and then the probabilities of the data to be coded are calculated according to the preprocessed data. Hence, the time for calculating the probabilities may be shortened, and a length of the time for image coding may be shortened.

In one or more embodiments, in 101, the convolutional neural networks are a type of feedforward neural networks including convolution calculation and having deep structures, which are one of representative algorithms of deep learning. By performing feature extraction on the image data to be processed by the convolutional neural networks, feature maps to which the image data correspond may be obtained.

In one or more embodiments, in 102, the feature maps obtained by the convolutional neural networks are in a form of analog data. By quantizing the feature maps in the form of analog data, feature maps in a discrete form may be obtained, and the feature maps in the discrete form are the data to be coded. In one or more embodiments, the quantization of the feature maps may be performed by using any quantization method, which is not limited in the embodiments of this disclosure.

In one or more embodiments, in 103, the preprocessed data with a smaller amount of data than the discrete feature maps may be generated according to the discrete feature maps in any manner. For example, part of the data may be selected as the preprocessed data from the discrete feature maps. For example, the preprocessed data include a plurality of data within a specified range centered on the current data to be coded.

As the preprocessed data include only a part of the data in the discrete feature maps, the amount of data in the preprocessed data is less than the amount of data in the discrete feature maps, hence, in performing probability estimation according to the preprocessed data, an amount of calculation of the probability estimation may be reduced, and an efficiency of the probability estimation may be improved.

In one or more embodiments, in 104, calculation of any type of probability model may be performed; for example, a Gaussian probability model, a Laplacian probability model, or the like, may be used. Taking the Gaussian probability model as an example, the Gaussian probability model may be obtained by estimating a mean value and variance or standard deviation of Gaussian distribution.

In one or more embodiments, in 104, probability estimation may be performed on the data to be coded in the discrete feature maps in any manner. For example, an entropy model including an autoregressive model and a hierarchical prior model may be used to perform probability estimation. The autoregressive model may perform point-by-point in an order of the data to be coded in the discrete feature maps; the estimated probabilities of the data to be coded are dependent on information on coded data preceding the data to be coded.

The autoregressive model may be in any form. For example, the autoregressive model may include a mask convolutional layer that convolves the preprocessed data. The mask convolutional layer is used to perform convolutional operation on a plurality of data centered on the data to be coded, and may set a weight of the coded data preceding the data to be coded to be 1, and set a weight of uncoded data after the data to be coded to be 0. And, the autoregressive model may have one or more mask convolutional layers, and in a case that it has multiple mask convolutional layers, dimensions of the multiple mask convolutional layers may be identical or different. However, the embodiments of this disclosure are not limited thereto, and other forms of autoregressive models may also be used for performing probability estimation.

In one or more embodiments, in using the mask convolutional layer to calculate the probabilities of the data to be coded in the discrete feature maps, the specified range to which the preprocessed data correspond is determined according to a dimension of the mask convolutional layer.

For example, in one embodiment, when the number of mask convolutional layers is one and the dimension of the mask convolutional layers is $n*n$ (n is an integer greater than 0), data in the discrete feature maps centered on the current data to be coded and having a range larger than or equal to $n*n$ and smaller than a size of a discrete feature map are taken as the preprocessed data. In one embodiment, only data in the discrete feature maps centered on the current data to be coded and within a range of $n*n$ may be taken as the preprocessed data.

As the size of the preprocessed data is greater than or equal to the size of the mask convolutional layer, performance of the mask convolutional layer will not be affected, nor will accuracy of the probability estimation be affected. And furthermore, as the mask convolutional layer only convolves the preprocessed data and the size of the preprocessed data is smaller than the size of the discrete feature map, the calculation time of the mask convolutional layer may be shortened.

For another example, in another embodiment, in a case where the number of mask convolutional layers is multiple and the dimensions of the mask convolutional layers are identical, which are all m*m, reference may be made to the manner where the number of mask convolutional layers is one for a manner for setting a size of the preprocessed data. For example, data in the discrete feature maps centered on the current data to be coded and having a range larger than or equal to m*m and smaller than the size of the discrete feature map are taken as the preprocessed data.

For a further example, in a further embodiment, in a case where the number of mask convolutional layers is multiple and the dimensions of the mask convolutional layers are different, data in the discrete feature maps centered on the current data to be coded and having a range larger than or equal to a*a and smaller than the size of the discrete feature map are taken as the preprocessed data; where a*a is a dimension of a largest mask convolutional layer in the multiple mask convolutional layers. Alternatively, data in different specified range may be respectively selected for each mask convolutional layer and taken as the preprocessed data; reference may be made to the manner where the number of mask convolutional layers is one for a manner for respectively selecting preprocessed data for each mask convolutional layer.

Figure 2:
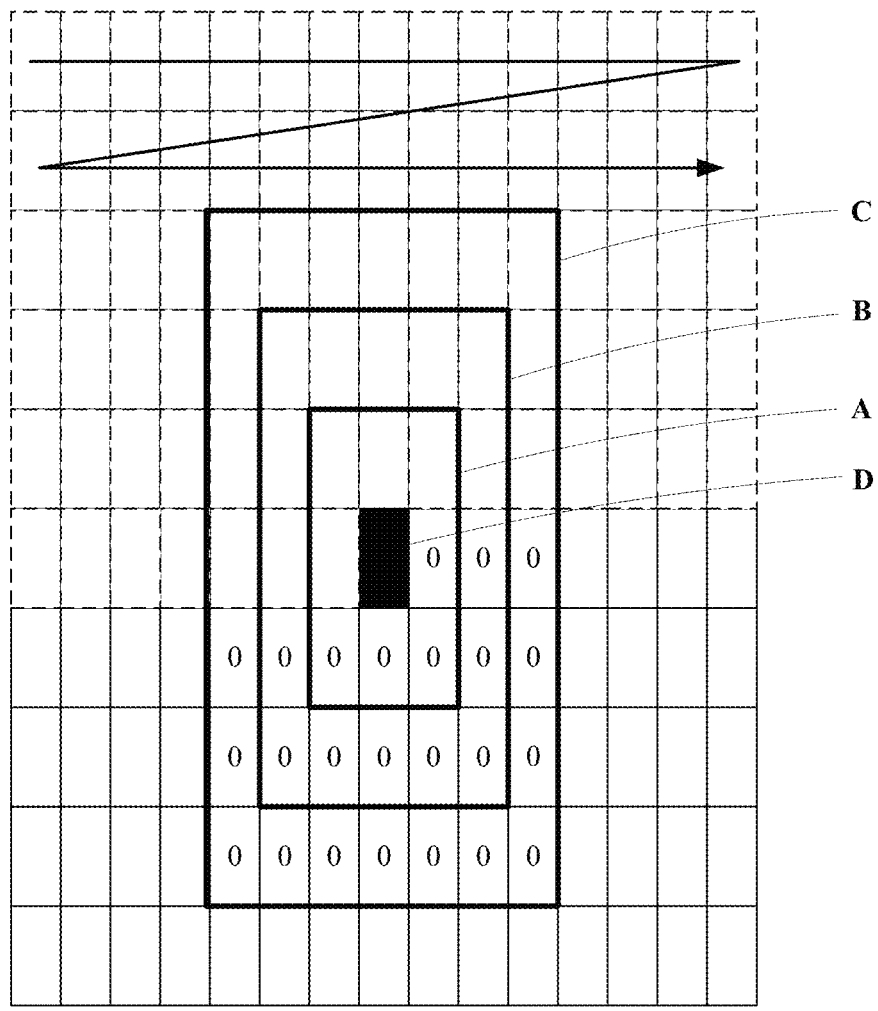
FIG. 2 is a schematic diagram of the preprocessed data of the embodiment of this disclosure.

FIG. 2 is a schematic diagram of the preprocessed data in the embodiment of this disclosure. For the sake of convenience of description, a feature map of 15*10 is exemplarily used in FIG. 2. It should be understood that the feature map may also be of other sizes, and this embodiment is not limited thereto.

As shown in FIG. 2, in this feature map, each rectangle denotes a discrete data to be coded, dotted line rectangles correspond to the coded data, a rectangle D corresponds to a current data to be coded and needing probability estimation, and probability estimation is performed on the data to be coded one by one in the direction indicated by the arrow.

Figure 3A:
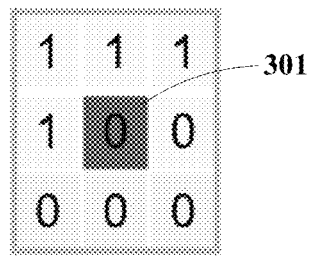
FIG. 3A is a schematic diagram of the mask convolutional layer of an embodiment of this disclosure.
Figure 3B:
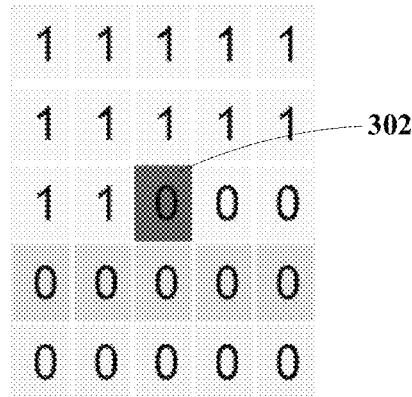
FIG. 3B is another schematic diagram of the mask convolutional layer of the embodiment of this disclosure.
Figure 3C:
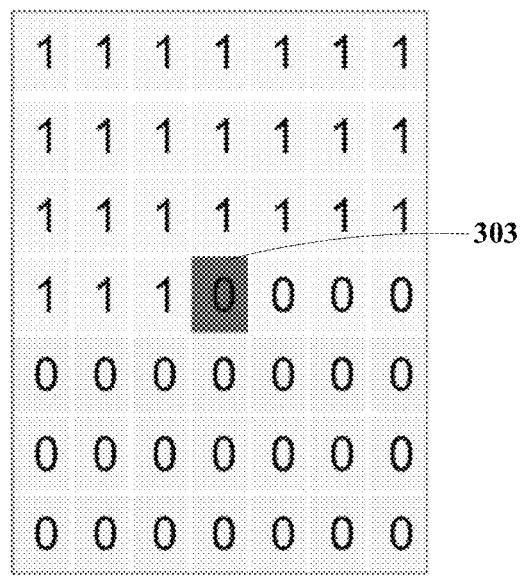
FIG. 3C is a further schematic diagram of the mask convolutional layer of the embodiment of this disclosure.

FIGS. 3A-3C are schematic diagrams of the mask convolutional layer of the embodiment of this disclosure. As shown in FIGS. 3A-3C, in a multi-dimensional context model, three mask convolutional layers of different dimensions may be used; dimensions of the mask convolutional layers may be 3*3, 5*5, 7*7, respectively.

For example, the 3*3 mask convolutional layer shown in FIG. 3A corresponds to the rectangle A in FIG. 2, the 5*5 mask convolutional layer shown in FIG. 3B corresponds to the rectangle B in FIG. 2, the 7*7 mask convolutional layer shown in FIG. 3C corresponds to the rectangle C in FIG. 2, and the rectangle 301 in FIG. 3A, the rectangle 302 in FIG. 3B and the rectangle 303 in FIG. 3C correspond to the rectangle D in FIG. 2, i.e. the current data to be coded.

As shown in FIG. 2 and FIG. 3A-FIG. 3C, as the estimated probabilities of the data to be coded are dependent on the information on the coded data preceding the data to be coded, a weight of the coded data preceding the data to be coded may be set to be 1, a weight of the uncoded data after the data to be coded may be set to be 0, and the estimated probabilities of the data to be coded are calculated according to formula 1:

$$\tilde{p}(\hat{y}) = \Pi_{i=1}^{m} \tilde{p}(\hat{y}_i | \hat{y}_{i-1}, \ldots, \hat{y}_0) \quad \text{(formula 1)};$$

where, $\tilde{p}(\hat{y})$ is the estimated probabilities of the data to be coded, $\tilde{p}(\hat{y}_i | \hat{y}_{i-1}, \ldots, \hat{y}_0)$ is a condition probability of data $\hat{y}_i$ relative to preceding data $\hat{y}_0, \ldots, \hat{y}_{i-1}$, and m is the number of the preceding data, which is related to the dimensions of the mask convolutional layers; for example, when the dimensions of the mask convolutional layers are 3*3, m=4, when the dimensions of the mask convolutional layers are 5*5, m=12, and when the dimensions of the mask convolutional layers are 7*7, m=24.

In a case where the number of the mask convolutional layers is 3 and the dimensions thereof are 3*3, 5*5 and 7*7, as shown in FIG. 2, data in a range of 7*7 centered on the current data D to be coded in the discrete feature map are taken as the preprocessed data (corresponding to the data in the rectangle C), and all the 3*3 mask convolutional layer, the 5*5 mask convolutional layer and the 7*7 mask convolutional layer perform convolutional operations in the preprocessed data of the size of 7*7, in which case in calculating the probability of the current data D, only one time of clipping is needed to generate the preprocessed data, irrespective of the number of mask convolutional layers.

Alternatively, as shown in FIG. 2, preprocessed data may be generated for each mask convolutional layer respectively. For example, data in a range of 3*3 centered on the current data D to be coded in the discrete feature map are taken as first preprocessed data (corresponding to the data in the rectangle A), data in a range of 5*5 centered on the current data D to be coded in the discrete feature map are taken as second preprocessed data (corresponding to the data in the rectangle B), data in a range of 7*7 centered on the current data D to be coded in the discrete feature map are taken as third preprocessed data (corresponding to the data in the rectangle C), and the 3*3 mask convolutional layer performs convolutional operation in the first preprocessed data, the 5*5 mask convolutional layer performs convolutional operation in the second preprocessed data, and the 7*7 mask convolutional layer performs convolutional operation in the third preprocessed data.

In one or more embodiments, in 105, the entropy coding is coding losing no information in a coding process according to the principle of entropy. In performing the entropy coding, the more accurate the presence probability of each data to be coded, the fewer bits may be used to denote the data to be coded. In 105, any kind of entropy coding may be used, such as Shannon coding, Huffman coding, and arithmetic coding, etc.

Figure 4:
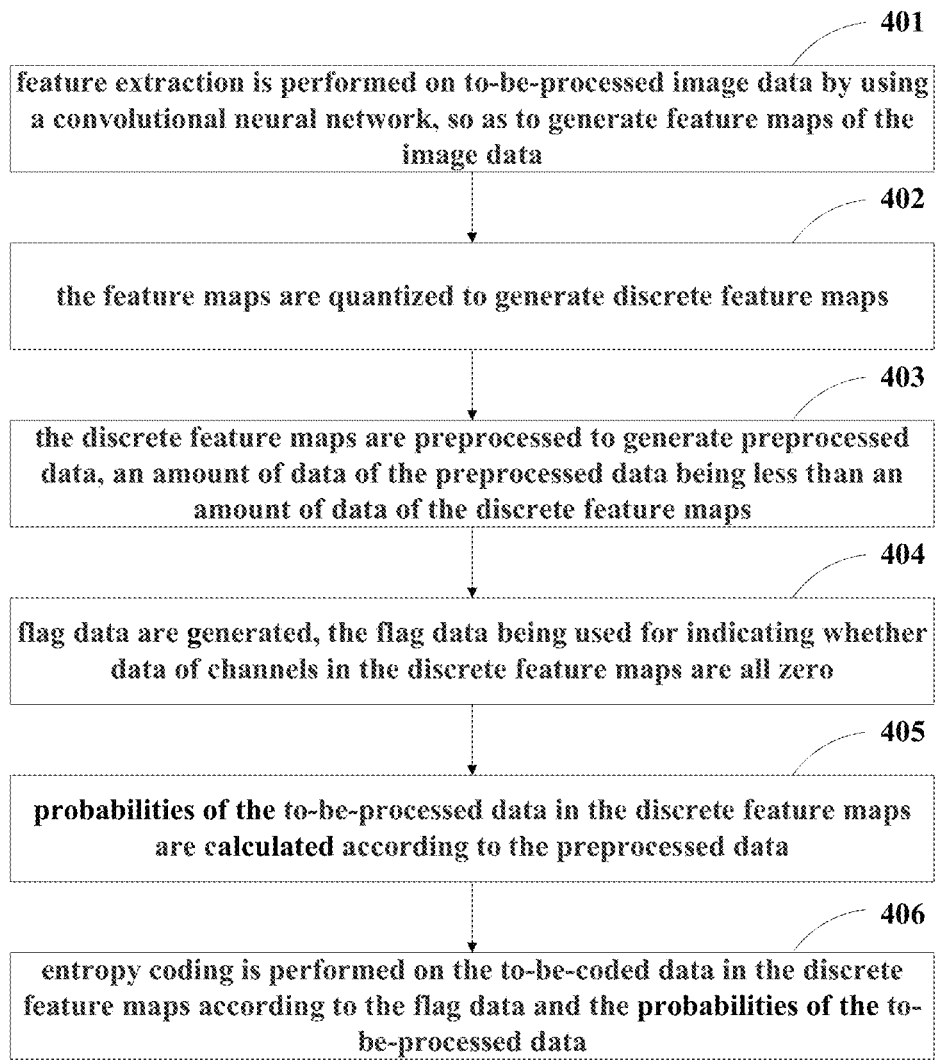
FIG. 4 is another schematic diagram of the process of the image coding method of the embodiment of this disclosure.

FIG. 4 is another schematic diagram of the process of the image coding method of the embodiment of this disclosure. As shown in FIG. 4, the image coding method includes:

401: feature extraction is performed on to-be-processed image data by using a convolutional neural network, to generate feature maps of the image data;

402: the feature maps are quantized to generate discrete feature maps;

403: the discrete feature maps are preprocessed to generate preprocessed data, an amount of data of the preprocessed data being less than an amount of data of the discrete feature maps;

404: flag data are generated, the flag data being used for indicating whether data of each channel in the discrete feature maps are all zero;

405: probabilities of the to-be-processed data in the discrete feature maps are calculated according to the preprocessed data; and

406: entropy coding is performed on the to-be-coded data in the discrete feature maps according to the flag data and the probabilities of the to-be-processed data.

In the embodiments of this disclosure, by generating the flag data indicating whether data of channels in the discrete feature maps are all zero and performing entropy coding on the to-be-coded data according to the flag data, the time for calculating the probabilities may be shortened, and a length of the time for image coding may be shortened.

In one or more embodiments, operations 401, 402, 403 and 405 may correspond to operations 101-104 respectively, the contents of which being incorporated herein, and being not going to be described herein any further.

In one or more embodiments, in 404, any manner may be used to determine whether data in a channel in the discrete feature maps are all zero. For example, it is assumed that a feature map of a size of h*w*channel is generated in 401; where, channel denotes the number of the feature maps, i.e. the number of channels, and h*w denotes a size of a single-channel feature map. In determining whether feature maps on an i-th channel are all-zero feature maps (i is an integer greater than 0 and less than or equal to c), absolute values of h*w data in the feature maps may be added up. When a result of addition is zero, the feature maps on the i-th channel are all-zero feature maps; or, in determining whether feature maps on an i-th channel are all-zero feature maps, h*w data in the feature maps are determined sequentially to determine whether they are zero. When all the h*w data are zero, the feature maps on the i-th channel are all-zero feature maps. However, the embodiment of this disclosure is not limited thereto, and whether the feature maps are all-zero feature maps may be determined in other manners.

In one or more embodiments, any manner may be used to indicate whether feature maps of each channel are all-zero feature maps. For example, a binary bit manner may be adopted, in which when feature maps are all zero, a bit position to the feature maps correspond is 0, and when the feature maps are not all zero, a bit position to the feature maps correspond is 1. Hence, whether the feature maps of the channel are all-zero feature maps may be denoted by a relatively small number of bits.

In one or more embodiments, in 406, in performing entropy coding on the data to be coded in the discrete feature maps according to the flag data and the probabilities of the data to be coded, for example, when the flag data indicate that data of a channel in the feature maps are all zero, no entropy coding is performed on the data to be coded of the channel in the discrete feature maps; and when the flag data indicate that data of a channel in the feature maps are not all zero, entropy coding is performed on the data to be coded according to the probabilities of the data to be coded of the channel.

For example, flag data may be generated with reference to pseudo-codes shown below and entropy coding is performed according to the flag data and the probabilities of the data to be coded.

| Algorithm: selective arithmetic decoder |
|---|
| Input: feature map of ŷ(h x w x channel) |
| Output: bit-stream |
| 1:         flags = zeros(channel) |
| 2:         for i in range(channel): |
| 3:             if sum(abs(ŷ[:,:,i])>0: |
| 4:                flags[i] = 1 |
| 5:             else: |
| 6:                flags[i] = 0 |
| 7:         for h_idx in range(h): |
| 8:             for w_idx in range(w): |
| 9:                for ch_idx in range(channel): |
| 10:                   if flags[ch_idx] == 1: |
| 11:         arithemetic_codec(y[h_idx,w_idx,ch_idx]) |

In one or more embodiments, in 405, the probabilities of the data to be coded in the discrete feature maps may be calculated according to the preprocessed data, or the probabilities of the data to be coded in the discrete feature maps may be calculated according to the flag data generated in 404.

For example, when it is indicated by the flag data that the data of a channel in the discrete feature maps are all zero, the probabilities of the data to be coded of the channel in the discrete feature maps are not calculated; and when it is indicated by the flag data that the data of a channel in the discrete feature maps are not all zero, the probabilities of the data to be coded of the channel in the discrete feature maps are calculated according to the preprocessed data, thereby further shortening the time for image coding.

Figure 5:
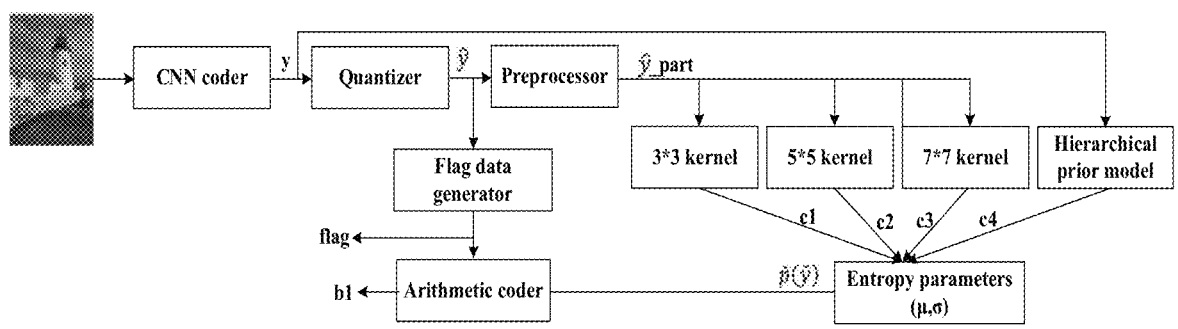
FIG. 5 is a schematic diagram of a structure of the image coding apparatus of an embodiment of this disclosure.

FIG. 5 is a schematic diagram of a structure of the image coding apparatus of an embodiment of this disclosure. The image coding method of this embodiment shall be particularly and exemplarily described below with reference to FIG. 5.

As shown in FIG. 5, first, feature extraction is performed on the to-be-processed image data by using the convolutional neural network, so as to generate latent image representations y (i.e. the feature maps) of the image data; the latent image representations y are quantized by a quantizer to obtain discrete latent image representations ŷ (i. e. the data to be coded); the discrete latent image representations ŷ are preprocessed by a preprocessor, data in the range of 7*7 centered on the current data to be coded in the discrete latent image representations ŷ are selected, and the selected data are taken as the preprocessed data ŷ_part; convolutional operations are performed on the preprocessed data ŷ_part by a 3*3 convolutional kernel, a 5*5 convolutional kernel, and a 7*7 convolutional kernel, respectively, so as to obtain operating results c1, c2 and c3; calculation is performed by a hierarchical prior model according to the latent image representations y to obtain a result c4; probability models of the data to be coded are obtained by an entropy parameter module according to the operating results c1, c2 and c3 and the result c4; taking Gaussian distribution as an example, a probability model includes a mean value μ and a standard deviation σ of Gaussian distribution, thereby obtaining the probabilities p̃(ŷ) of the data to be coded; a flag data generator generates flag data flag indicating whether the discrete latent image representations ŷ are all zero on channels, and an arithmetic coder performs entropy coding on the discrete latent image representations ŷ according to the probabilities p̃(ŷ) and the flag data flag to generate a code stream b1 denoting the image data.

In one or more embodiments, the flag data flag and the code stream b1 denoting the image data may be used for network transmission or storage. At a decoder side, corresponding decoding is performed on the code stream b1 according to the flag data flag, so as to reconstruct the image data.

It should be noted that FIG. 1 or 4 only schematically illustrate the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 1 or 4.

By preprocessing the discrete feature maps, the preprocessed data of a relatively small amount of data may be generated, and according to the preprocessed data, the probabilities of the data to be coded may be calculated.

Hence, the time for calculating the probabilities may be shortened, thereby shortening the time for image coding.

Second Aspect of the Embodiments

Figure 6:
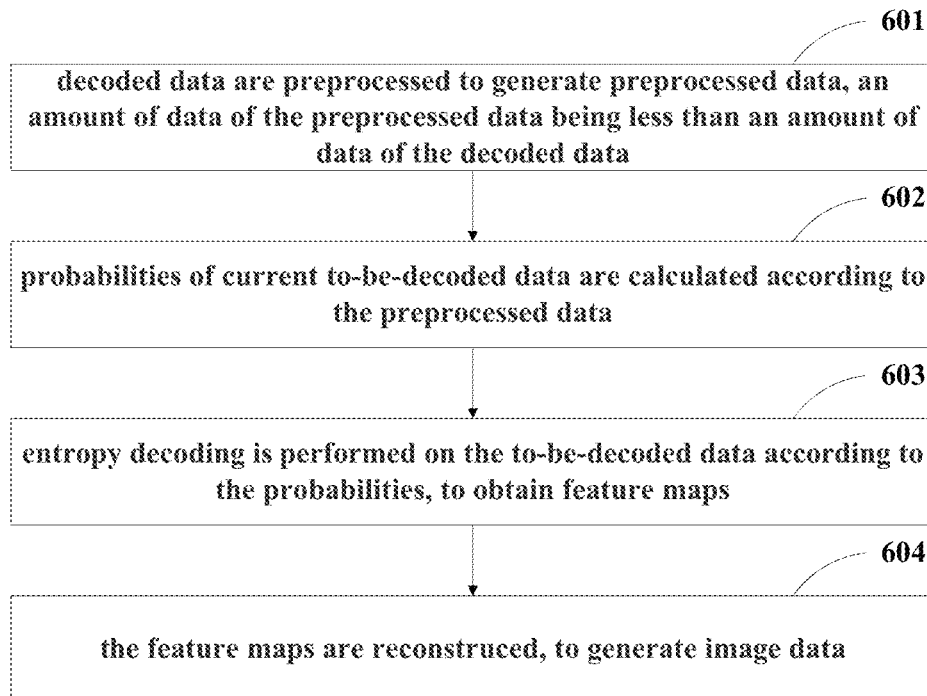
FIG. 6 is a schematic diagram of a process of the image decoding method of an embodiment of this disclosure.

The embodiments of this disclosure provide an image decoding method. FIG. 6 is a schematic diagram of a process of the image decoding method of the embodiment of this disclosure. As shown in FIG. 6, the method includes:

601: decoded data are preprocessed to generate preprocessed data, an amount of data of the preprocessed data being less than an amount of data of the decoded data;

602: probabilities of current to-be-decoded data are calculated according to the preprocessed data;

603: entropy decoding is performed on the to-be-decoded data according to the probabilities, to obtain feature maps; and

604: the feature maps are reconstructed, to generate image data.

In the embodiments of this disclosure, by preprocessing the decoded data, preprocessed data with a small amount of data are generated, and then the probabilities of the data to be decoded are calculated according to the preprocessed data. Hence, the time for calculating the probabilities may be shortened, and a length of the time for image decoding may be shortened.

In one or more embodiments, in 601, the preprocessed data with an amount of data smaller than that of the decoded data may be generated according to the decoded data. For example, a part of data may be selected from the decoded data. For example, the preprocessed data include multiple data in a specific range centered on a current data to be decoded. As the preprocessed data include only a part of data in the decoded data, the amount of data of the preprocessed data is smaller than that of the decoded data. Hence, an amount of calculation may be lowered in performing probability estimation according to the preprocessed data, thereby improving efficiency of the probability estimation.

In one or more embodiments, in 602, calculation of any type of probability model may be performed; for example, a Gaussian probability model, a Laplacian probability model, or the like, may be used. Taking the Gaussian probability model as an example, the Gaussian probability model may be obtained by estimating a mean value and variance or standard deviation of Gaussian distribution.

In one or more embodiments, in 602, probability estimation may be performed on the data to be decoded in any manner. For example, an entropy model including an autoregressive model and a hierarchical prior model may be used to perform probability estimation. The autoregressive model may perform point-by-point in an order of the data to be decoded; the estimated probabilities of the data to be decoded are dependent on information on decoded data preceding the data to be decoded.

The autoregressive model may be in any form. For example, the autoregressive model may include a mask convolutional layer that convolves the preprocessed data. The mask convolutional layer is used to perform convolutional operation on a plurality of data centered on the data to be decoded, and may set a weight of the coded data preceding the data to be decoded to be 1, and set a weight of uncoded data after the data to be decoded to be 0. And, the autoregressive model may have one or more mask convolutional layers, and in a case that it has multiple mask convolutional layers, dimensions of the multiple mask convolutional layers may be identical or different. However, this disclosure is not limited thereto, and other forms of autoregressive models may also be used for performing probability estimation.

In one or more embodiments, in using the mask convolutional layer to calculate the probabilities of the data to be decoded, the specified range to which the preprocessed data correspond is determined according to a dimension of the mask convolutional layer. For example, when the number of mask convolutional layers is one, the specified range may be equal to the dimension of the mask convolutional layer, and when the number of mask convolutional layers is multiple, the specified range may be equal to a maximum dimension of the multiple mask convolutional layers, or the specified range may be equal to dimensions of the mask convolutional layers. A particular manner is as described in the first aspect of the embodiments, the contents of which being incorporated herein, and being not going to be described herein any further.

In one or more embodiments, in 603, any kind of entropy decoding may be used, such as decoding to which Shannon coding, or Huffman coding, or arithmetic coding, etc., corresponds.

In one or more embodiments, in 604, the convolutional neural networks are a type of feedforward neural networks including convolution calculation and having deep structures, which are one of representative algorithms of deep learning. By reestablishing feature maps by the convolutional neural networks, image data may be reconstructed.

Figure 7:
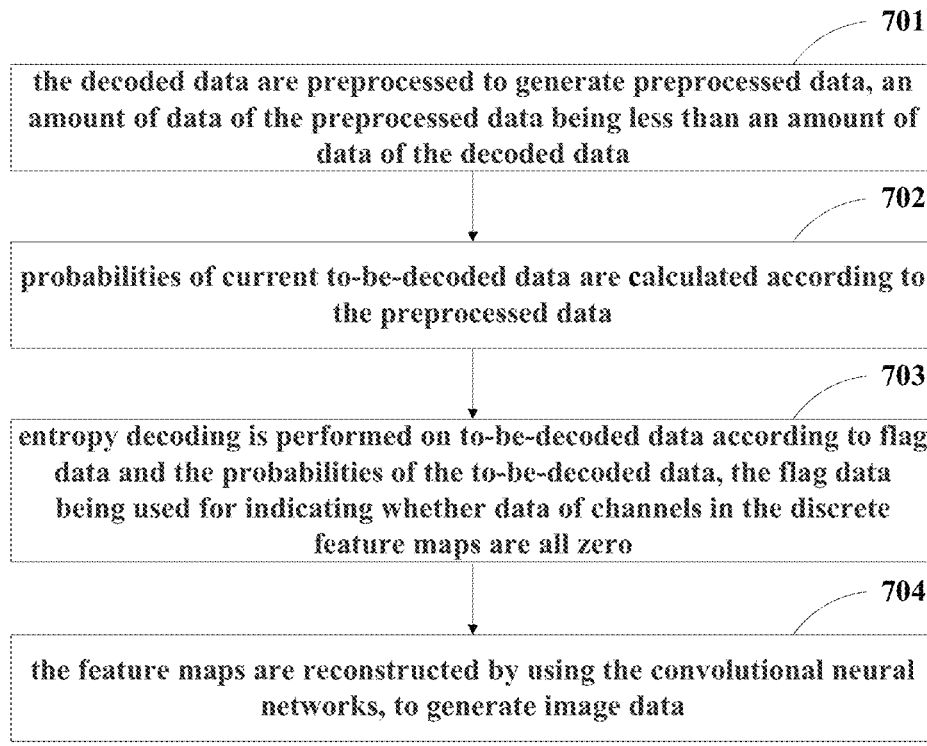
FIG. 7 is another schematic diagram of the process of the image decoding method of an embodiment of this disclosure.

FIG. 7 is another schematic diagram of the process of the image decoding method of the embodiment of this disclosure. As shown in FIG. 7, the image decoding method includes:

701: the decoded data are preprocessed to generate preprocessed data, an amount of data of the preprocessed data being less than an amount of data of the decoded data;

702: probabilities of current to-be-decoded data are calculated according to the preprocessed data; and

703: entropy decoding is performed on the to-be-decoded data according to flag data and the probabilities of the to-be-decoded data, the flag data being used for indicating whether data of channels in the discrete feature maps are all zero; and

704: the feature maps are reconstructed by using the convolutional neural networks, to generate image data.

In one or more embodiments, operations 701, 702 and 704 may correspond to operations 401, 402 and 404 respectively, the contents of which being incorporated herein, and being not going to be described herein any further.

In one or more embodiments, in 703, the flag data may be data in any form, that is, any manner may be used to indicate whether feature maps of a channel are all-zero feature maps. For example, a binary bit mode may be adopted. When a bit is 0, it means that corresponding feature maps are all zero, and when a bit is 1, it means that corresponding feature maps are not all zero. Hence, whether the feature maps are all-zero feature maps may be denoted by a relatively small number of bits.

In one or more embodiments, in 703, in performing entropy coding on the data to be decoded according to the flag data and the probabilities of the data to be decoded, for example, when the flag data indicate that data of a channel in the feature maps are all zero, all-zero feature maps are generated for the channel, and when the flag data indicate that data of a channel in the feature maps are not all zero, entropy decoding is performed on the data to be decoded according to the probabilities of the data to be decoded of the channel, so as to obtain the feature maps.

In one or more embodiments, in 702, the probabilities of the data to be decoded may be calculated according to the preprocessed data, and the probabilities of the data to be decoded may also be calculated according to the flag data. For example, when the flag data indicate that the data of a channel in the feature maps are all zero, the probabilities of data to be decoded of the channel are not calculated, and when the flag data indicate that the data of a channel in the feature maps are not all zero, the probabilities of data to be decoded of the channel are calculated according to the preprocessed data, thereby further shortening the time for the image decoding.

Figure 8:
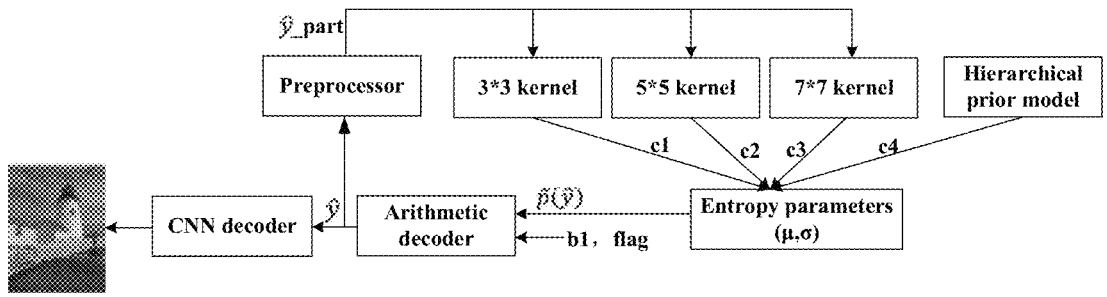
FIG. 8 is a schematic diagram of a structure of the image decoding apparatus of an embodiment of this disclosure.

FIG. 8 is a schematic diagram of a structure of the image decoding apparatus of an embodiment of this disclosure. The image decoding method of this embodiment shall be particularly and exemplarily described below with reference to FIG. 8.

As shown in FIG. 8, first, entropy decoding is performed by an arithmetic decoder on the code stream b1 denoting the image data to obtain discrete latent image representations ŷ (i.e. the feature maps); then, decoding is performed by a convolutional neural network decoder on the latent image representations ŷ to reconstruct the image data.

In performing entropy decoding by an arithmetic decoder, the probability denoted by the current latent image representations ŷ and the flag data flag indicating whether data of channels in currently processed feature map are all zero need to be used; the probability may be calculated in a manner as below: the discrete latent image representations ŷ are preprocessed by a preprocessor, data in the range of 7*7 centered on the current data to be decoded in the discrete latent image representations ŷ are selected, and the selected data are taken as the preprocessed data ŷ_part; convolutional operations are performed on the preprocessed data ŷ_part by a 3*3 convolutional kernel, a 5*5 convolutional kernel, and a 7*7 convolutional kernel, respectively, so as to obtain operating results c1, c2 and c3; calculation is performed by a hierarchical prior model to obtain a result c4; probability models of the data to be decoded are obtained by an entropy parameter module according to the operating results c1, c2 and c3 and the result c4; taking Gaussian distribution as an example, a probability model includes a mean value μ and a standard deviation σ of Gaussian distribution, thereby obtaining the probabilities p̃(ŷ) of the data to be decoded; and an arithmetic coder performs entropy decoding on the code stream b1 according to the probabilities p̃(ŷ) and the flag data flag to generate the discrete latent image representations ŷ, and decoding is performed by a convolutional neural network decoder on the latent image representations ŷ so as to reconstruct the image data.

It should be noted that FIG. 6 or 7 only schematically illustrate the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 6 or 7.

By preprocessing the decoded data, the preprocessed data of a relatively small amount of data may be generated, and according to the preprocessed data, the probabilities of the data to be decoded may be calculated. Hence, the time for calculating the probabilities may be shortened, thereby shortening the time for image decoding.

Third Aspect of the Embodiments

Figure 9:
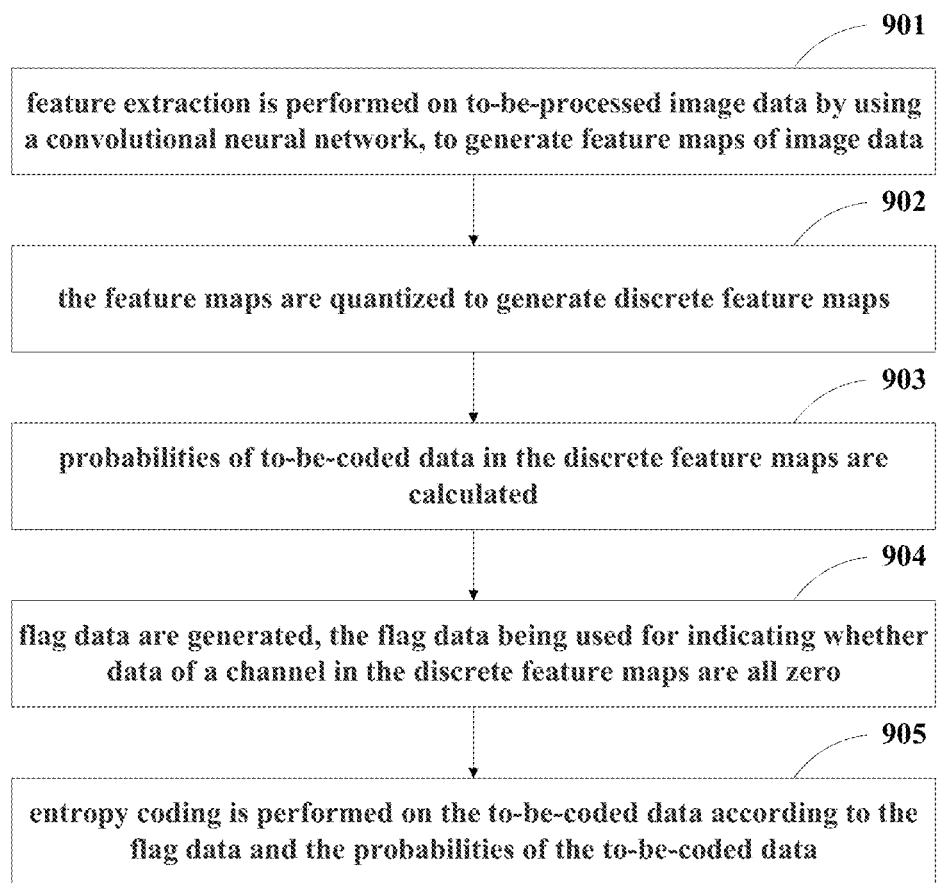
FIG. 9 is a schematic diagram of a process of the image coding method of an embodiment of this disclosure.

The embodiments of this disclosure provide an image coding method. FIG. 9 is a schematic diagram of a process of the image coding method of the embodiment of this disclosure. As shown in FIG. 9, the method includes:

901: feature extraction is performed on to-be-processed image data by using a convolutional neural network, to generate feature maps of the image data;

902: the feature maps are quantized to generate discrete feature maps;

903: probabilities of to-be-coded data in the discrete feature maps are calculated;

904: flag data are generated, the flag data being used for indicating whether data of channels in the discrete feature maps are all zero; and

905: entropy coding is performed on the to-be-coded data according to the flag data and the probabilities of the to-be-coded data.

In the embodiments of this disclosure, by generating the flag data indicating whether data of channels in the discrete feature maps are all zero and performing entropy coding on the to-be-coded data according to the flag data, a length of the time for image coding may be shortened.

In one or more embodiments, operations 901 and 902 may correspond to operations 101 and 102 respectively in the first aspect of the embodiments, the contents of which being incorporated herein, and being not going to be described herein any further.

In one or more embodiments, in 903, the probabilities of the data to be decoded may be calculated according to all data in the discrete feature maps, or the probabilities of the data to be decoded may be calculated according to a part of data in the discrete feature maps, as described in the first aspect of the embodiments, the contents of which being incorporated herein, and being not going to be described herein any further.

In one or more embodiments, operations 904 and 905 may correspond to operations 404 and 406 respectively in the first aspect of the embodiments, the contents of which being incorporated herein, and being not going to be described herein any further.

In one or more embodiments, in 905, in performing entropy coding on the data to be coded in a channel in the discrete feature maps according to the flag data and the probabilities of the data to be coded, for example, when the flag data indicate that the data of a channel in the discrete feature maps are all zero, no entropy coding is performed on the data to be coded of the channel in the discrete feature maps; and when the flag data indicate that data of a channel in the feature maps are not all zero, entropy coding is performed on the data to be coded according to the probabilities of the data to be coded of the channel.

In one or more embodiments, in 903, the probabilities of the data to be coded in the discrete feature maps may also be calculated according to the flag data generated in 904. For example, when the flag data indicate that the data of a channel in the discrete feature maps are all zero, probabilities of the data to be coded of the channel in the discrete feature maps are not calculated; and when the flag data indicate that data of a channel in the feature maps are not all zero, probabilities of the data to be coded of the channel in the discrete feature maps are calculated according to the preprocessed data. Hence, the time for image coding may further be shortened.

It should be noted that FIG. 9 only schematically illustrate the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 9.

By generating the flag data indicating whether data of channels in the discrete feature maps are all zero and performing entropy coding on the to-be-coded data according to the flag data, a length of the time for image coding may be shortened.

Fourth Aspect of the Embodiments

Figure 10:
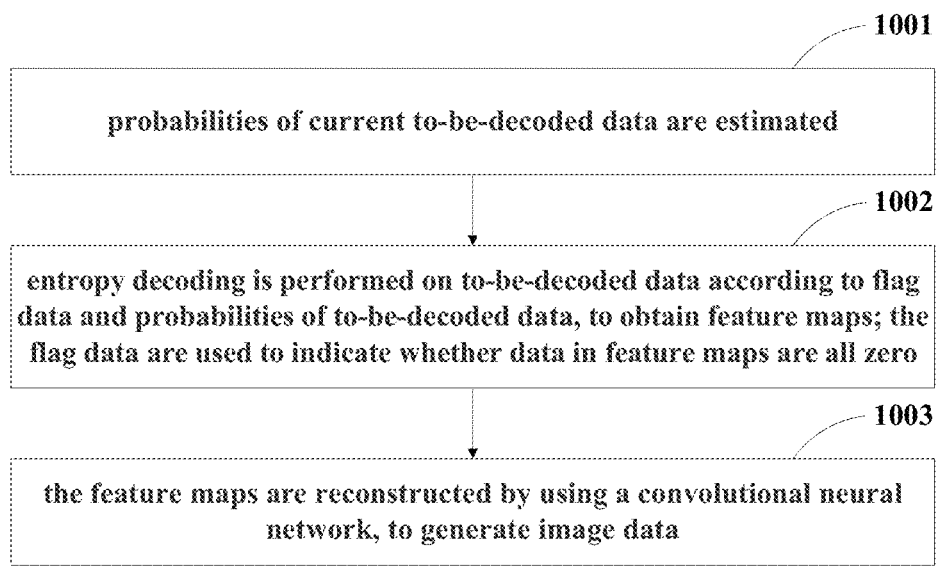
FIG. 10 is a schematic diagram of a process of the image decoding method of an embodiment of this disclosure.

The embodiments of this disclosure provide an image decoding method. FIG. 10 is a schematic diagram of a process of the image decoding method of the embodiment of this disclosure. As shown in FIG. 10, the method includes:

1001: probabilities of current to-be-decoded data are estimated;

1002: entropy decoding is performed on the to-be-decoded data according to flag data and the probabilities of the to-be-decoded data, to obtain feature maps; the flag data are used to indicate whether data of channels in the feature maps are all zero; and 1003: the feature maps are reconstructed by using a convolutional neural network, to generate image data.

In the embodiments of this disclosure, by performing entropy decoding on the to-be-decoded data according to the flag data indicating whether the data of the channels the feature maps are all zero, the time for image decoding may be shortened.

In one or more embodiments, in 1001, the probabilities of the current data to be decoded may be calculated according to all the decoded data, or as described in the second aspect of the embodiments, the probabilities of the current data to be decoded may be calculated according to a part of the decoded data, the contents of which being incorporated herein, and being not going to be described herein any further.

In one or more embodiments, operations 1002 and 1003 may correspond to operations 703 and 704 respectively in the second aspect of the embodiments, the contents of which being incorporated herein, and being not going to be described herein any further.

In one or more embodiments, in 1002, in performing entropy decoding on the data to be decoded according to the flag data and the probabilities of the data to be decoded, for example, when the flag data indicate that the data of a channel in the feature maps are all zero, all-zero feature maps are generated for the channel; and when the flag data indicate that data of a channel in the feature maps are not all zero, entropy decoding is performed on the data to be decoded according to the probabilities of the data to be decoded of the channel to obtain the feature maps.

In one or more embodiments, in 1001, the probabilities of the data to be decoded may be calculated according to the flag data. For example, when it is indicated by the flag data that the data of a channel in the discrete feature maps are all zero, the probabilities of the data to be decoded of the channel are not calculated; and when it is indicated by the flag data that the data of a channel in the discrete feature maps are not all zero, the probabilities of the data to be decoded of the channel are calculated according to the preprocessed data, thereby further shortening the time for image decoding.

It should be noted that FIG. 10 only schematically illustrate the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 10.

By perform entropy decoding on the data to be decoded according to the flag data indicating whether data of channels in the discrete feature maps are all zero, the time for image decoding may be shortened.

Fifth Aspect of Embodiments

The embodiments of this disclosure provide an image coding apparatus. As a principle of the apparatus for solving problems is similar to that of the method in the first aspect of embodiments, reference may be made to the implementation of the method in the first aspect of embodiments for implementation of the apparatus, with identical contents being not going to be described herein any further.

Figure 11:
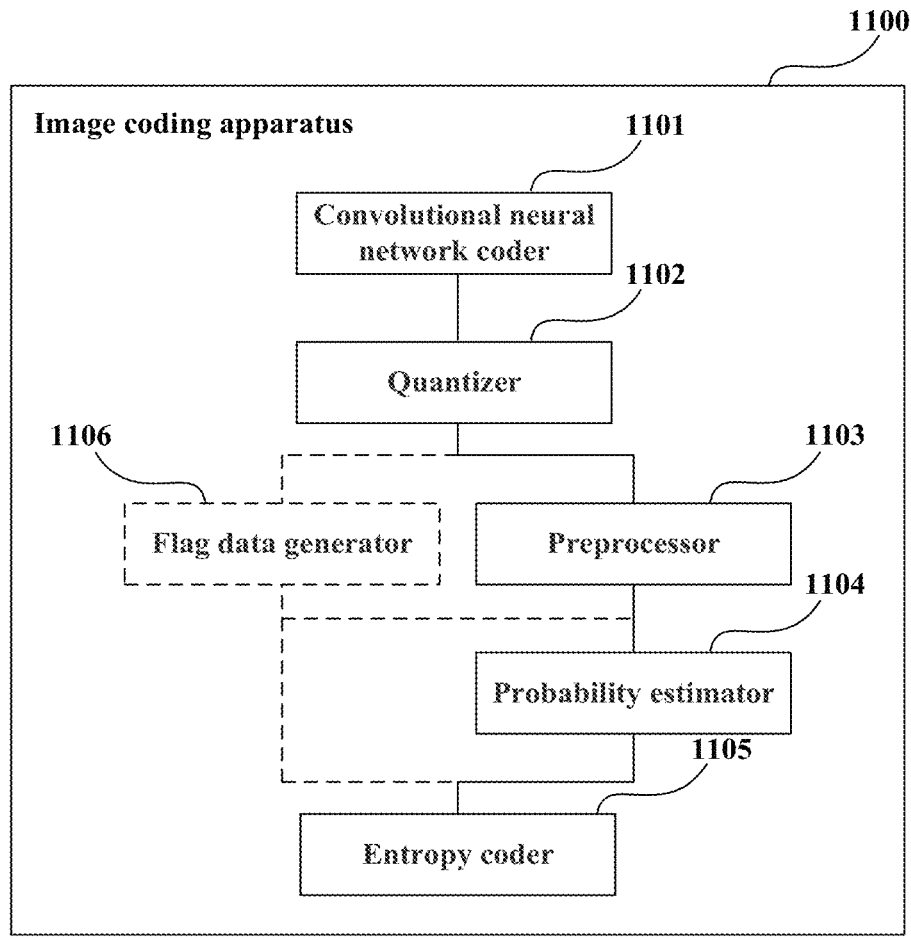
FIG. 11 is a schematic diagram of a structure of the image coding apparatus of an embodiment of this disclosure.

FIG. 11 is a schematic diagram of a structure of an image coding apparatus 1100 of the embodiment of this disclosure. As shown in FIG. 11, the apparatus 1100 includes:

a convolutional neural network coder 1101 configured to perform feature extraction on to-be-processed image data by using a convolutional neural network, so as to generate feature maps of the image data;

a quantizer 1102 configured to quantize the feature maps to generate discrete feature maps;

a preprocessor 1103 configured to preprocess the discrete feature maps to generate preprocessed data, an amount of data of the preprocessed data being less than an amount of data of the discrete feature maps;

a probability estimator 1104 configured to calculate probabilities of to-be-coded data in the discrete feature maps according to the preprocessed data; and an entropy coder 1105 configured to perform entropy coding on the to-be-coded data according to the probabilities of the to-be-coded data.

In one or more embodiments, reference may be made to operations 101-105 in the first aspect of embodiments for implementations of the convolutional neural network coder 1101, the quantizer 1102, the preprocessor 1103, the probability estimator 1104 and the entropy coder 1105, which shall not be described herein any further.

In one or more embodiments, the preprocessor 1103 may select a part of data in the discrete feature maps as the preprocesses data; the preprocessed data include multiple data in a specified range centered on a current to-be-coded data.

In one or more embodiments, the probability estimator 1104 includes a mask convolutional layer, the mask convolutional layer performing convolutional operation on the preprocessed data, and the specified range corresponding to a dimension of the mask convolutional layer.

In one or more embodiments, the specified range is equal to the dimension of the mask convolutional layer when the number of the mask convolutional layer is one, and when the number of the mask convolutional layers is multiple, the specified range is equal to a maximum dimension of the mask convolutional layers, or the specified range is equal to dimensions of the mask convolutional layers.

In one or more embodiments, as shown in FIG. 11, the image coding apparatus 1100 further includes: a flag data generator 1106 configured to generate flag data, the flag data being used for indicating whether data of channels in the discrete feature maps are all zero; and the entropy coder 1105 may further perform entropy coding on the to-be-coded data in the discrete feature maps according to the flag data.

In one or more embodiments, when the flag data indicate that data of a channel in the discrete feature maps are all zero, the entropy coder 1105 does not perform entropy coding on to-be-coded data in the discrete feature maps of the channel, and when the flag data indicate that data of a channel in the discrete feature maps are not all zero, the entropy coder performs entropy coding on the to-be-coded data in the channel according to the probabilities of the to-be-coded data.

In one or more embodiments, reference may be made to operations 404 and 406 in the first aspect of embodiments for implementations of the flag data generator 1106 and the entropy coder 1105, which shall not be described herein any further.

In one or more embodiments, the probability estimator 1104 may further calculate the probabilities of the data to be coded in the discrete feature maps according to the flag data generated by the data generator. For example, when it is indicated by the flag data that the data of a channel in the discrete feature maps are all zero, the probabilities of the data to be coded of the channel in the discrete feature maps are not calculated; and when it is indicated by the flag data that the data of a channel in the discrete feature maps are not all zero, the probabilities of the data to be coded of the channel in the discrete feature maps are calculated according to the preprocessed data, thereby further shortening the time for image coding.

By preprocessing the discrete feature maps, the preprocessed data of a relatively small amount of data may be generated, and according to the preprocessed data, the probabilities of the data to be coded may be calculated. Hence, the time for calculating the probabilities may be shortened, thereby shortening the time for image coding.

Sixth Aspect of the Embodiments

The embodiments of this disclosure provide an image decoding apparatus. As a principle of the apparatus for solving problems is similar to that of the method in the second aspect of embodiments, reference may be made to the implementation of the method in the second aspect of embodiments for implementation of the apparatus, with identical contents being not going to be described herein any further.

Figure 12:
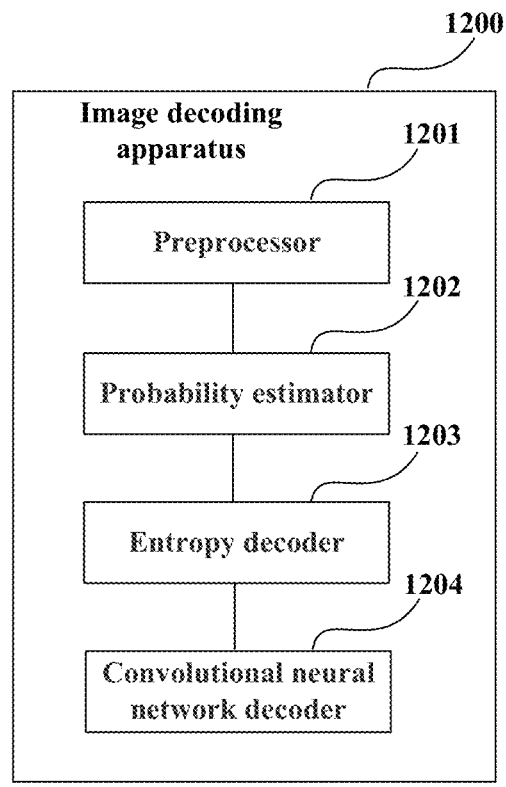
FIG. 12 is a schematic diagram of a structure of the image decoding apparatus of an embodiment of this disclosure.

FIG. 12 is a schematic diagram of a structure of the image decoding apparatus of the embodiment of this disclosure. As shown in FIG. 12, an apparatus 1200 includes:

a preprocessor 1201 configured to preprocess decoded data to generate preprocessed data, an amount of data of the preprocessed data being less than an amount of data of the decoded data;

a probability estimator 1202 configured to calculate probabilities of current to-be-decoded data according to the preprocessed data;

an entropy decoder 1203 configured to perform entropy decoding on the to-be-decoded data according to the probabilities, so as to obtain feature maps; and a convolutional neural network decoder 1204 configured to reconstruct the feature maps, so as to generate image data.

In one or more embodiments, reference may be made to operations 601-604 in the second aspect of embodiments for implementations of the preprocessor 1201, the probability estimator 1202, the entropy decoder 1203 and the convolutional neural network decoder 1204, which shall not be described herein any further.

In one or more embodiments, the preprocessor 1201 selects a part of data in the decoded data as the preprocessed data. The preprocessed data include multiple data in a specific range centered on a current data to be decoded.

In one or more embodiments, the probability estimator 1202 includes a mask convolutional layer, the mask convolutional layer performing convolutional operation on the preprocessed data, and the specified range corresponding to a dimension of the mask convolutional layer.

In one or more embodiments, the specified range is equal to the dimension of the mask convolutional layer when the number of the mask convolutional layer is one, and when the number of the mask convolutional layers is multiple, the specified range is equal to a maximum dimension of the mask convolutional layers, or the specified range is equal to dimensions of the mask convolutional layers.

In one or more embodiments, the entropy decoder 1203 further performs entropy decoding on the to-be-decoded data according to flag data, the flag data being used for indicating whether data of channels in the discrete feature maps are all zero.

In one or more embodiments, when the flag data indicate that data of a channel in the feature maps are all zero, the entropy decoder 1203 generates all-zero feature maps on the channel, and when the flag data indicate that data of a channel in the feature maps are not all zero, the entropy decoder 1203 performs entropy decoding on the data to be decoded on the channel according to the probabilities of the data to be decoded, so as to obtain the feature maps.

In one or more embodiments, reference may be made to operation 703 in the second aspect of embodiments for implementation of the entropy decoder 1203, which shall not be described herein any further.

In one or more embodiments, the probability estimator 1202 may also calculate the probabilities of the data to be decoded according to the flag data. For example, when the flag data indicate that the data of a channel in the feature maps are all zero, the probability estimator 1202 does not calculate the probabilities of data to be decoded of the channel, and when the flag data indicate that the data of a channel in the feature maps are not all zero, the probability estimator 1202 calculates the probabilities of data to be decoded of the channel according to the preprocessed data, thereby further shortening the time for the image decoding.

By preprocessing the decoded data, the preprocessed data of a relatively small amount of data may be generated, and according to the preprocessed data, the probabilities of the data to be decoded may be calculated. Hence, the time for calculating the probabilities may be shortened, thereby shortening the time for image decoding.

Seventh Aspect of the Embodiments

The embodiments of this disclosure provide an image coding apparatus. As a principle of the apparatus for solving problems is similar to that of the method in the third aspect of embodiments, reference may be made to the implementation of the method in the third aspect of embodiments for implementation of the apparatus, with identical contents being not going to be described herein any further.

Figure 13:
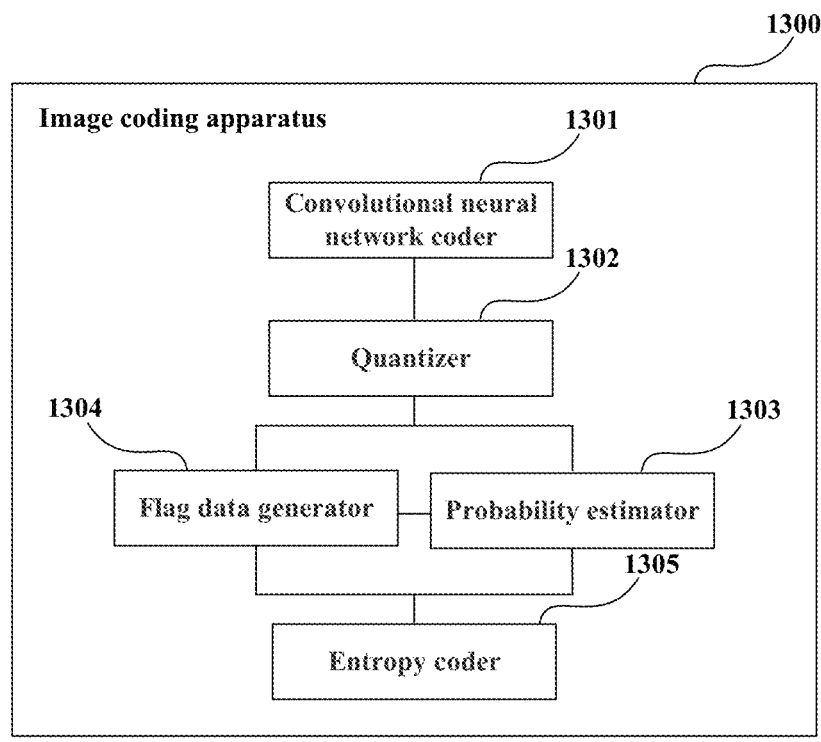
FIG. 13 is a schematic diagram of a structure of the image coding apparatus of an embodiment of this disclosure.

FIG. 13 is a schematic diagram of a structure of an image coding apparatus 1300 of the embodiment of this disclosure. As shown in FIG. 13, the apparatus 1300 includes:

a convolutional neural network coder 1301 configured to perform feature extraction on to-be-processed image data by using a convolutional neural network, so as to generate feature maps of the image data;

a quantizer 1302 configured to quantize the feature maps to generate discrete feature maps;

a probability estimator 1303 configured to calculate probabilities of to-be-coded data in the discrete feature maps;

a flag data generator 1304 configured to generate flag data, the flag data being used for indicating whether data of a channel in the discrete feature maps are all zero; and an entropy coder 1305 configured to perform entropy coding on the to-be-coded data according to the flag data and the probabilities of the to-be-coded data.

In one or more embodiments, reference may be made to operations 901-905 in the third aspect of embodiments for implementations of the convolutional neural network coder 1301, the quantizer 1302, the probability estimator 1303, the flag data generator 1304 and the entropy coder 1305, which shall not be described herein any further.

In one or more embodiments, when the flag data indicate that data of a channel in the discrete feature maps are all zero, the entropy coder 1305 does not perform entropy coding on to-be-coded data in the discrete feature maps of the channel, and when the flag data indicate that data of a channel in the discrete feature maps are not all zero, the entropy coder 1305 performs entropy coding on the to-be-coded data in the channel according to the probabilities of the to-be-coded data.

In one or more embodiments, the probability estimator 1303 may further calculate the probabilities of the data to be coded in the discrete feature maps according to the flag data generated by the flag data generator 1304. For example, when the flag data indicate that the data of a channel in the discrete feature maps are all zero, the probability estimator 1303 does not calculate the probabilities of the data to be coded of the channel in the discrete feature maps; and when the flag data indicate that data of a channel in the feature maps are not all zero, the probability estimator 1303 calculates the probabilities of the data to be coded of the channel in the discrete feature maps according to the preprocessed data. Hence, the time for image coding may further be shortened.

By generating the flag data indicating whether data of channels in the discrete feature maps are all zero and performing entropy coding on the to-be-coded data according to the flag data, a length of the time for image coding may be shortened.

Eighth Aspect of the Embodiments

The embodiments of this disclosure provide an image decoding apparatus. As a principle of the apparatus for solving problems is similar to that of the method in the fourth aspect of embodiments, reference may be made to the implementation of the method in the fourth aspect of embodiments for implementation of the apparatus, with identical contents being not going to be described herein any further.

Figure 14:
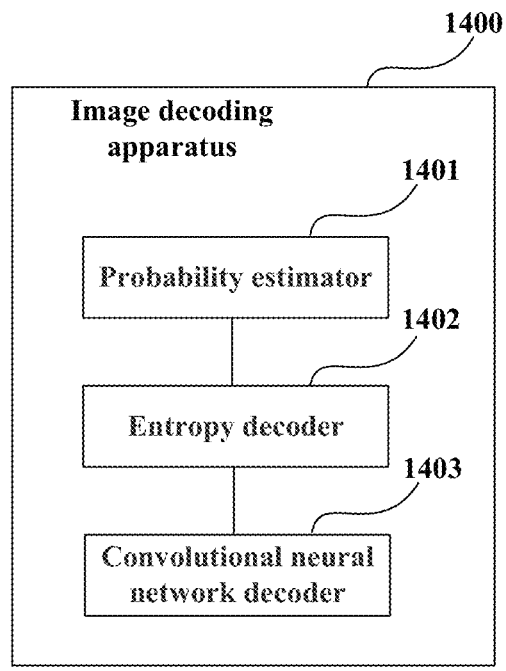
FIG. 14 is a schematic diagram of a structure of the image decoding apparatus of an embodiment of this disclosure.

FIG. 14 is a schematic diagram of a structure of the image decoding apparatus of the embodiment of this disclosure. As shown in FIG. 14, an apparatus 1400 includes:

a probability estimator 1401 configured to estimate probabilities of current to-be-decoded data;

an entropy decoder 1402 configured to perform entropy decoding on the to-be-decoded data according to flag data and the probabilities of the to-be-decoded data, so as to obtain feature maps; the flag data are used to indicate whether data of channels in the feature maps are all zero; and a convolutional neural network decoder 1403 configured to reconstruct the feature maps, so as to generate image data.

In one or more embodiments, reference may be made to operations 1001-1003 in the fourth aspect of embodiments for implementations of the probability estimator 1401, the entropy decoder 1402 and the convolutional neural network decoder 1403, which shall not be described herein any further.

In one or more embodiments, when the flag data indicate that data of a channel in the feature maps are all zero, the entropy decoder 1402 generates all-zero feature maps for the channel, and when the flag data indicate that data of a channel in the feature maps are not all zero, the entropy decoder performs entropy decoding on the to-be-decoded data of the channel according to the probabilities of the to-be-decoded data, so as to obtain the feature maps.

In one or more embodiments, the probability estimator 1401 may calculate the probabilities of the data to be decoded according to the flag data. For example, when it is indicated by the flag data that the data of a channel in the discrete feature maps are all zero, the probability estimator 1401 does not calculate the probabilities of the data to be decoded of the channel; and when it is indicated by the flag data that the data of a channel in the discrete feature maps are not all zero, the probability estimator 1401 calculates the probabilities of the data to be decoded according to the preprocessed data, thereby further shortening the time for image decoding.

By performing entropy decoding on the to-be-decoded data according to the flag data indicating whether the data of the channels in the feature maps are all zero, the time for image decoding may be shortened.

Ninth Aspect of the Embodiments

The embodiments of this disclosure provide an electronic device, including the image coding apparatus described in the fifth aspect of the embodiments, or the image decoding apparatus described in the sixth aspect of the embodiments, or the image coding apparatus described in the seventh aspect of the embodiments, or the image decoding apparatus described in the eighth aspect of the embodiments, the contents of which being incorporated herein. The electronic device may be, for example, a computer, a server, a workstation, a laptop computer, and a smart phone, etc.; however, the embodiment of this disclosure is not limited thereto.

Figure 15:
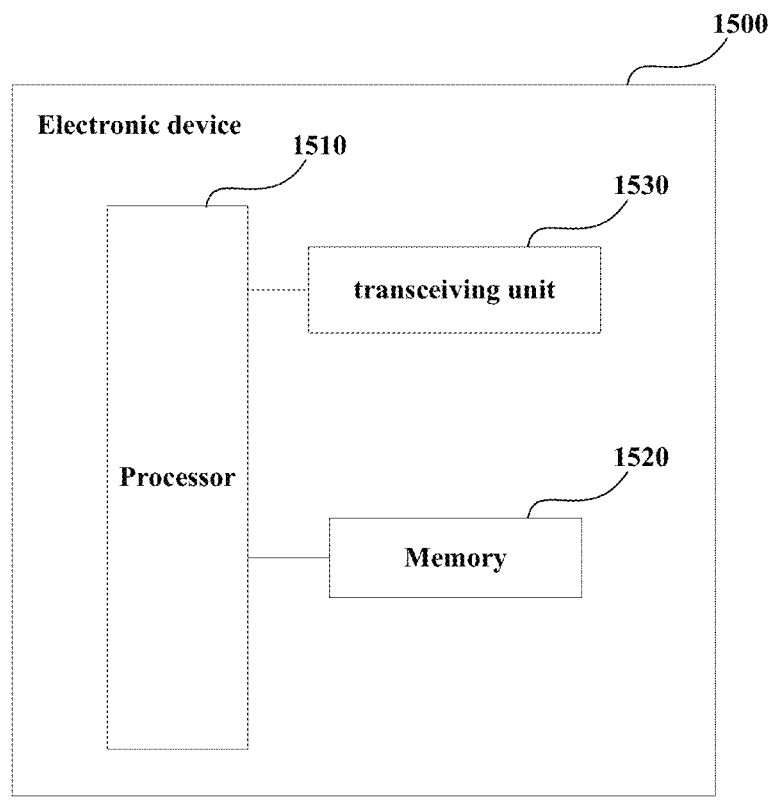
FIG. 15 is a schematic diagram of a structure of the electronic device of an embodiment of this disclosure.

FIG. 15 is a schematic diagram of a structure of the electronic device of the embodiment of this disclosure. As shown in FIG. 15, an electronic device 1500 may include a processor (such as a central processing unit (CPU)) 1510 and a memory 1520, the memory 1520 being coupled to the central processing unit 1510. The memory 1520 may store various data, and furthermore, it may store a program for information processing, and execute the program under control of the processor 1510.

In one embodiment, the functions of the image coding apparatus 1100 or the image decoding apparatus 1200 or the image coding apparatus 1300 or the image decoding apparatus 1400 may be integrated into processor 1510. The processor 1510 may be configured to carry out the image coding method described in the first aspect of the embodiments or the image decoding method described in the second aspect of the embodiments or the image coding method described in the third aspect of the embodiments or the image decoding method described in the fourth aspect of the embodiments.

In another embodiment, the image coding apparatus 1100 or the image decoding apparatus 1200 or the image coding apparatus 1300 or the image decoding apparatus 1400 and the processor 1510 may be configured separately. For example, the image coding apparatus 1100 or the image decoding apparatus 1200 or the image coding apparatus 1300 or the image decoding apparatus 1400 may be configured as a chip connected to the processor 1510, with the functions of the image coding apparatus 1100 or the image decoding apparatus 1200 or the image coding apparatus 1300 or the image decoding apparatus 1400 being carried out under control of the processor 1510.

For example, the processor 1510 may be configured to perform following control: performing feature extraction on to-be-processed image data by using a convolutional neural network, so as to generate feature maps of the image data; quantizing the feature maps to generate discrete feature maps; preprocessing the discrete feature maps to generate preprocessed data, an amount of data of the preprocessed data being less than an amount of data of the discrete feature maps; calculating probabilities of to-be-coded data in the discrete feature maps according to the preprocessed data; and performing entropy coding on the to-be-coded data according to the probabilities of the to-be-coded data.

Or, for example, the processor 1510 may be configured to perform following control: preprocessing decoded data to generate preprocessed data, an amount of data of the preprocessed data being less than an amount of data of the decoded data; calculating probabilities of current to-be-decoded data according to the preprocessed data; performing entropy decoding on the to-be-decoded data according to the probabilities, so as to obtain feature maps; and reconstructing the feature maps, so as to generate image data.

Or, for example, the processor 1510 may be configured to perform following control: performing feature extraction on to-be-processed image data by using a convolutional neural network, so as to generate feature maps of the image data; quantizing the feature maps to generate discrete feature maps; calculating probabilities of to-be-coded data in the discrete feature maps; generating flag data, the flag data being used for indicating whether data of a channel in the discrete feature maps are all zero; and performing entropy coding on the to-be-coded data according to the flag data and the probabilities of the to-be-coded data.

Or, for example, the processor 1510 may be configured to perform following control: estimating probabilities of current to-be-decoded data; performing entropy decoding on the to-be-decoded data according to flag data and the probabilities of the to-be-decoded data, so as to obtain feature maps; the flag data are used to indicate whether data of channels in the feature maps are all zero; and reconstructing the feature maps, so as to generate image data.

Reference may be made to the first to the fourth aspects of the embodiments for a particular implementation of the processor 1510, which shall not be described herein any further.

Furthermore, as shown in FIG. 15, the electronic device 1500 may include a transceiving unit 1530, etc. Functions of the above components are similar to those in the relevant art, and shall not be described herein any further. It should be noted that the electronic device 1500 does not necessarily include all the parts shown in FIG. 15, and furthermore, the electronic device 1500 may include parts not shown in FIG. 15, and the relevant art may be referred to.

An embodiment of the present disclosure provides a computer readable program code, which, when executed in an image coding apparatus, will cause a computer to carry out the image coding method described in the first aspect or the third aspect of the embodiments in the image coding apparatus.

An embodiment of the present disclosure provides a computer storage medium, including a computer readable program code, which will cause a computer to carry out the image coding method described in the first aspect or the third aspect of the embodiments in an image coding apparatus.

An embodiment of the present disclosure provides a computer readable program code, which, when executed in an image decoding apparatus, will cause a computer to carry out the image decoding method described in the second aspect or the fourth aspect of the embodiments in the image decoding apparatus.

An embodiment of the present disclosure provides a computer storage medium, including a computer readable program code, which will cause a computer to carry out the image decoding method described in the second aspect or the fourth aspect of the embodiments in an image decoding apparatus.

The image coding methods in the image coding apparatuses or the image decoding methods in the image decoding apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps (operations) shown in FIGs. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of an image encoding apparatus or an image decoding apparatus, and may also be stored in a memory card of a pluggable image encoding apparatus or image decoding apparatus.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

1. An image coding method, including:

performing feature extraction on to-be-processed image data by using a convolutional neural network, so as to generate feature maps of the image data;

quantizing the feature maps to generate discrete feature maps;

preprocessing the discrete feature maps to generate preprocessed data, an amount of data of the preprocessed data being less than an amount of data of the discrete feature maps;

calculating probabilities of to-be-coded data in the discrete feature maps according to the preprocessed data; and performing entropy coding on the to-be-coded data according to the probabilities of the to-be-coded data.

2. The image coding apparatus according to supplement 1, a part of data in the discrete feature maps are selected as the preprocesses data; wherein the preprocessed data include multiple data in a specified range centered on a current to-be-coded data.

3. The image coding apparatus according to supplement 2, in calculating the probabilities of to-be-coded data in the discrete feature maps by using a mask convolutional layer, the specified range corresponds to a dimension of the mask convolutional layer.

4. The image coding apparatus according to supplement 3, the specified range is equal to the dimension of the mask convolutional layer when the number of the mask convolutional layer is one, and when the number of the mask convolutional layers is multiple, the specified range is equal to a maximum dimension of the mask convolutional layers, or the specified range is equal to dimensions of the mask convolutional layers.

5. The image coding apparatus according to supplement 1, wherein the image coding apparatus further includes:

generating flag data, the flag data being used for indicating whether data of channels in the discrete feature maps are all zero;

performing entropy coding on the to-be-coded data in the discrete feature maps according to the flag data and the probabilities of to-be-coded data.

6. The image coding apparatus according to supplement 5, wherein, when the flag data indicate that data of a channel in the discrete feature maps are all zero, no entropy coding is performed on to-be-coded data in the discrete feature maps of the channel, and when the flag data indicate that data of a channel in the discrete feature maps are not all zero, entropy coding is performed on the to-be-coded data in the channel according to the probabilities of the to-be-coded data.

7. An image decoding method, including:

preprocessing decoded data to generate preprocessed data, an amount of data of the preprocessed data being less than an amount of data of the decoded data;

calculating probabilities of current to-be-decoded data according to the preprocessed data;

performing entropy decoding on the to-be-decoded data according to the probabilities, so as to obtain feature maps; and reconstructing the feature maps, so as to generate image data.

8. The image decoding apparatus according to supplement 7, wherein a part of data in the decoded data are selected as the preprocessed data; wherein the preprocessed data include multiple data in a specific range centered on a current data to be decoded.

9. The image decoding apparatus according to supplement 8, wherein in calculating the probabilities of the data to be decoded, the specified range corresponds to a dimension of the mask convolutional layer.

10. The image decoding apparatus according to supplement 9, wherein when the number of mask convolutional layers is one, the specified range is equal to the dimension of the mask convolutional layer, and when the number of mask convolutional layers is multiple, the specified range is equal to a maximum dimension of the multiple mask convolutional layers, or the specified range is equal to dimensions of the mask convolutional layers.

11. The image decoding apparatus according to supplement 7, wherein the performing entropy decoding on the to-be-decoded data according to the probabilities, so as to obtain feature maps, includes:

performing entropy decoding on the to-be-decoded data according to flag data and the probabilities of the to-be-decoded data, the flag data being used for indicating whether data of channels in the discrete feature maps are all zero.

12. The image decoding apparatus according to supplement 11, wherein, when the flag data indicate that data of a channel in the feature maps are all zero, all-zero feature maps are generated in the channel, and when the flag data indicate that data of a channel in the feature maps are not all zero, entropy decoding is performed on the data to be decoded of the channel according to the probabilities of the data to be decoded, so as to obtain the feature maps.

13. An image coding method, including:

performing feature extraction on to-be-processed image data by using a convolutional neural network, so as to generate feature maps of the image data;

quantizing the feature maps to generate discrete feature maps;

calculating probabilities of to-be-coded data in the discrete feature maps;

generating flag data, the flag data being used for indicating whether data of a channel in the discrete feature maps are all zero; and performing entropy coding on the to-be-coded data according to the flag data and the probabilities of the to-be-coded data.

14. The image coding method according to supplement 13, wherein, when the flag data indicate that data of a channel in the discrete feature maps are all zero, no entropy coding is performed on to-be-coded data in the discrete feature maps of the channel, and when the flag data indicate that data of a channel in the discrete feature maps are not all zero, entropy coding is performed on the to-be-coded data in the channel according to the probabilities of the to-be-coded data.

15. An image decoding method, including:

estimating probabilities of current to-be-decoded data;

performing entropy decoding on the to-be-decoded data according to flag data and the probabilities of the to-be-decoded data, so as to obtain feature maps; wherein the flag data are used to indicate whether data of channels in the feature maps are all zero; and reconstructing the feature maps, so as to generate image data.

16. The image decoding method according to supplement 15, wherein, when the flag data indicate that data of a channel in the feature maps are all zero, all-zero feature maps are generated for the channel, and when the flag data indicate that data of a channel in the feature maps are not all zero, entropy decoding is performed on the to-be-decoded data of the channel according to the probabilities of the to-be-decoded data, so as to obtain the feature maps.

17. An image coding apparatus, including:
a convolutional neural network coder configured to perform feature extraction on to-be-processed image data by using a convolutional neural network, so as to generate feature maps of the image data;
a quantizer configured to quantize the feature maps to generate discrete feature maps;
a preprocessor configured to preprocess the discrete feature maps to generate preprocessed data, an amount of data of the preprocessed data being less than an amount of data of the discrete feature maps;
a probability estimator configured to calculate probabilities of to-be-coded data in the discrete feature maps according to the preprocessed data; and
an entropy coder configured to perform entropy coding on the to-be-coded data according to the probabilities of the to-be-coded data.

18. The image coding apparatus according to supplement 17, characterized in that the preprocessor selects a part of data in the discrete feature maps as the preprocesses data; wherein the preprocessed data include multiple data in a specified range centered on a current to-be-coded data.

19. The image coding apparatus according to supplement 18, the probability estimator includes a mask convolutional layer, the mask convolutional layer performing convolutional operation on the preprocessed data, and the specified range corresponding to a dimension of the mask convolutional layer.

20. The image coding apparatus according to supplement 19, the specified range is equal to the dimension of the mask convolutional layer when the number of the mask convolutional layer is one, and when the number of the mask convolutional layers is multiple, the specified range is equal to a maximum dimension of the mask convolutional layers, or the specified range is equal to dimensions of the mask convolutional layers.

21. The image coding apparatus according to supplement 17, wherein the image coding apparatus further includes:
a flag data generator configured to generate flag data, the flag data being used for indicating whether data of channels in the discrete feature maps are all zero;
and the entropy coder further performs entropy coding on the to-be-coded data in the discrete feature maps according to the flag data.

22. The image coding apparatus according to supplement 21, wherein,
when the flag data indicate that data of a channel in the discrete feature maps are all zero, the entropy coder does not perform entropy coding on to-be-coded data in the discrete feature maps of the channel, and when the flag data indicate that data of a channel in the discrete feature maps are not all zero, the entropy coder performs entropy coding on the to-be-coded data in the discrete feature maps of the channel according to the probabilities of the to-be-coded data.

23. An image decoding apparatus, including:
a preprocessor configured to preprocess decoded data to generate preprocessed data, an amount of data of the preprocessed data being less than an amount of data of the decoded data;
a probability estimator configured to calculate probabilities of current to-be-decoded data according to the preprocessed data;
an entropy decoder configured to perform entropy decoding on the to-be-decoded data according to the probabilities, so as to obtain feature maps; and
a convolutional neural network decoder configured to reconstruct the feature maps, so as to generate image data.

24. The image decoding apparatus according to supplement 23, wherein the preprocessor selects a part of data in the decoded data as the preprocessed data; wherein the preprocessed data include multiple data in a specified range centered on a current to-be-decoded data.

25. The image decoding apparatus according to supplement 24, wherein the probability estimator includes a mask convolutional layer, the mask convolutional layer performing convolutional operation on the preprocessed data, and the specified range corresponding to a dimension of the mask convolutional layer.

26. The image decoding apparatus according to supplement 25, wherein the specified range is equal to the dimension of the mask convolutional layer when the number of the mask convolutional layer is one, and when the number of the mask convolutional layers is multiple, the specified range is equal to a maximum dimension of the mask convolutional layers, or the specified range is equal to dimensions of the mask convolutional layers.

27. The image decoding apparatus according to supplement 23, wherein the entropy decoder further performs entropy decoding on the to-be-decoded data according to the flag data, the flag data being used for indicating whether data of channels in the discrete feature maps are all zero.

28. The image decoding apparatus according to supplement 27, wherein,
when the flag data indicate that data of a channel in the feature maps are all zero, the entropy decoder generates all-zero feature maps on the channel, and when the flag data indicate that data of a channel in the feature maps are not all zero, the entropy decoder performs entropy decoding on the data to be decoded on the channel according to the probabilities of the data to be decoded, so as to obtain the feature maps.

29. An image coding apparatus, including:
a convolutional neural network coder configured to perform feature extraction on to-be-processed image data by using a convolutional neural network, so as to generate feature maps of the image data;
a quantizer configured to quantize the feature maps to generate discrete feature maps;
a probability estimator configured to calculate probabilities of to-be-coded data in the discrete feature maps;
a flag data generator configured to generate flag data, the flag data being used for indicating whether data of a channel in the discrete feature maps are all zero; and
an entropy coder configured to perform entropy coding on the to-be-coded data according to the flag data and the probabilities of the to-be-coded data, so as to generate a binary code stream.

30. The image coding apparatus according to supplement 29, wherein,
when the flag data indicate that data of a channel in the discrete feature maps are all zero, the entropy coder does not perform entropy coding on to-be-coded data in the discrete feature maps of the channel, and when the flag data indicate that data of a channel in the discrete feature maps are not all zero, the entropy coder performs entropy coding on the to-be-coded data in the channel according to the probabilities of the to-be-coded data.

31. An image decoding apparatus, including:
a probability estimator configured to estimate probabilities of current to-be-decoded data;
an entropy decoder configured to perform entropy decoding on the to-be-decoded data according to flag data and the probabilities of the to-be-decoded data, so as to obtain feature maps; wherein the flag data are used to indicate whether data of channels in the feature maps are all zero; and
a convolutional neural network decoder configured to reconstruct the feature maps, so as to generate image data.

32. The image decoding apparatus according to supplement 31, wherein,
when the flag data indicate that data of a channel in the feature maps are all zero, the entropy decoder generates all zero feature maps for the channel, and when the flag data indicate that data of a channel in the feature maps are not all zero, the entropy decoder performs entropy decoding on the to-be-decoded data of the channel according to the probabilities of the to-be-decoded data, so as to obtain the feature maps.

What is claimed is:

1. An image coding apparatus, comprising:
a convolutional neural network coder configured to perform feature extraction on to-be-processed image data by using a convolutional neural network, to generate feature maps of the image data;
a quantizer configured to quantize the feature maps to generate discrete feature maps;
a probability estimator configured to calculate probabilities of to-be-coded data in the discrete feature maps;
a flag data generator configured to generate flag data, the flag data being used for indicating whether data of a channel in the discrete feature maps are all zero; and
an entropy coder configured to perform entropy coding on the to-be-coded data according to the flag data and the probabilities of the to-be-coded data, to generate a binary code stream,
wherein,
when the flag data indicate that data of the channel in the discrete feature maps are all zero, the entropy coder does not perform entropy coding on to-be-coded data in the discrete feature maps of the channel, and
when the flag data indicate that data of a channel in the discrete feature maps are not all zero, the entropy coder performs entropy coding on the to-be-coded data in the channel according to the probabilities of the to-be-coded data.

2. An image decoding apparatus, comprising:
a probability estimator configured to estimate probabilities of current to-be-decoded data;
an entropy decoder configured to perform entropy decoding on the to-be-decoded data according to flag data and the probabilities of the to-be-decoded data, to obtain feature maps; wherein the flag data are used to indicate whether data of channels in the feature maps are all zero; and
a convolutional neural network decoder configured to reconstruct the feature maps, to generate image data, wherein,
when the flag data indicate that data of a channel among the channels in the feature maps are all zero, the entropy decoder generates all-zero feature maps for the channel, and
when the flag data indicate that data of the channel in the feature maps are not all zero, the entropy decoder performs entropy decoding on the to-be-decoded data of the channel according to the probabilities of the to-be-decoded data, to obtain the feature maps.

3. The image coding apparatus according to claim 1, wherein the image coding apparatus further comprises:
a preprocessor configured to preprocess the discrete feature maps to generate preprocessed data, an amount of data of the preprocessed data being less than an amount of data of the discrete feature maps, and
the probability estimator is configured to calculate the probabilities of the to-be-coded data in the discrete feature maps according to the preprocessed data.

4. The image coding apparatus according to claim 3, wherein the preprocessor selects a part of data in the discrete feature maps as the preprocesses data,
wherein the preprocessed data comprise multiple data in a specified range centered on a current to-be-coded data.

5. The image coding apparatus according to claim 4, wherein the probability estimator comprises a mask convolutional layer, the mask convolutional layer performing convolutional operation on the preprocessed data, and the specified range corresponding to a dimension of the mask convolutional layer.

6. The image coding apparatus according to claim 5, wherein the specified range is equal to the dimension of the mask convolutional layer when a number of the mask convolutional layer is one, and when a number of the mask convolutional layers is multiple, the specified range is equal to a maximum dimension of the mask convolutional layers, or the specified range is equal to dimensions of the mask convolutional layers.

* * * * *